United States Patent
Purandare (10) Patent No.: US 10,169,495 B2
(45) Date of Patent: *Jan. 1, 2019

(54) METHOD FOR VERIFYING HARDWARE/SOFTWARE CO-DESIGNS

(71) Applicant: International Business Machines Corporation, Armonk, NY (US)

(72) Inventor: Mitra Purandare, Zurich (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/955,793

(22) Filed: Apr. 18, 2018

(65) Prior Publication Data

US 2018/0232467 A1 Aug. 16, 2018

Related U.S. Application Data

(63) Continuation of application No. 14/813,157, filed on Jul. 30, 2015, now Pat. No. 9,996,637.

(51) Int. Cl.
*G06F 9/44* (2018.01)
*G06F 17/50* (2006.01)
*G06F 11/36* (2006.01)

(52) U.S. Cl.
CPC .......... *G06F 17/50* (2013.01); *G06F 11/3608* (2013.01)

(58) Field of Classification Search
CPC ............ G06F 17/5022; G06F 11/3604; G06F 11/3608; G06F 17/50; G06F 17/505; G06F 2217/86
See application file for complete search history.

(56) References Cited

U.S. PATENT DOCUMENTS

| | | | |
|---|---|---|---|
| 5,960,182 A | | 9/1999 | Matsuoka et al. |
| 6,110,220 A | * | 8/2000 | Dave ................... G06F 17/5045 716/105 |
| 6,209,120 B1 | | 3/2001 | Kurshan et al. |
| 6,356,862 B2 | | 3/2002 | Bailey |

(Continued)

FOREIGN PATENT DOCUMENTS

EP 1065611 A2 1/2001

OTHER PUBLICATIONS

James A. Rowson; Hardware/Software Co-Simulation; DAC; 2 pages; <https://www.cs.york.ac.uk/rts/docs/DAC-1964-2005/PAPERS/1994/DAC94_439.PDF> (Year: 1994).*

(Continued)

*Primary Examiner* — Geoffrey R St Leger
*Assistant Examiner* — Cuong V Luu
(74) *Attorney, Agent, or Firm* — Michael A. Petrocelli (57) ABSTRACT

A method for formally verifying a hardware/software co-design includes providing in a co-design, a first model, and a second model, the first model is one of a hardware model, and the second model is one of a software model, or vice versa, providing a safety property expected to be satisfied by the co-design, combining an abstraction of the first model and the safety property to obtain an abstracted first model, composing the abstracted first model and the second model to obtain a composed model, checking if the composed model satisfies the safety property, and signaling that the hardware/software co-design violates the safety property if the safety property is violated in the composed model.

18 Claims, 6 Drawing Sheets

(56) References Cited

U.S. PATENT DOCUMENTS

| | | | |
|---|---|---|---|
| 6,490,545 B1* | 12/2002 | Peng | G06F 11/261 |
| | | | 717/135 |
| 7,150,011 B2* | 12/2006 | Ha | G06F 9/4411 |
| | | | 717/148 |
| 7,310,594 B1* | 12/2007 | Ganesan | G06F 17/5054 |
| | | | 717/100 |
| 7,725,851 B2 | 5/2010 | Eisner et al. | |
| 7,792,933 B2 | 9/2010 | Butts et al. | |
| 7,885,802 B2 | 2/2011 | Calvez | |
| 8,326,592 B2 | 12/2012 | McMillan | |
| 8,639,487 B1 | 1/2014 | Ezer et al. | |
| 9,003,343 B2* | 4/2015 | Zhou | G06F 17/5036 |
| | | | 716/106 |
| 2001/0011210 A1 | 8/2001 | Bailey | |
| 2003/0154465 A1* | 8/2003 | Bollano | G06F 17/5022 |
| | | | 717/137 |
| 2004/0088150 A1 | 5/2004 | Gay | |
| 2009/0064064 A1 | 3/2009 | Eisner et al. | |
| 2009/0083683 A1* | 3/2009 | Snell | G06F 17/5022 |
| | | | 716/106 |
| 2009/0164193 A1 | 6/2009 | McMillan | |
| 2009/0164968 A1 | 6/2009 | Kurshan et al. | |
| 2017/0031806 A1 | 2/2017 | Purandare | |

OTHER PUBLICATIONS

Ivo Bolsens et al.; Hardware/Software Co-Design of Digital Telecommunication Systems; IEEE; pp. 391-481; <https://ieeexplore.ieee.org/stamp/stamp.jsp?tp=&arnumber=558713> (Year: 1997).*

John Schewel; A Hardware Software Co-Design System sing Configurable Computing Technology; IEEE; pp. 620-625; <https://ieeexplore.ieee.org/stamp/stamp.jsp?tp=&arnumber=669991> (Year: 1998).*

Jorg Henkel et al.; High-Level Estimation Techniques for Usage in Hardware/Software Co-Design; IEEE; pp. 353-360; <https://ieeexplore.ieee.org/stamp/stamp.jsp?tp=&arnumber=669500> (Year: 1998).*

Frank P. Coyle et al.; From UML to HDL a Model Driven Architectural Approach to Hardware-Software Co-Design; Citeseer; 6 pages; <http://citeseerx.ist.psu.edu/viewdoc/download?doi=10.1.1.59.5410&rep=rep1&type=pdf> (Year: 2005).*

Pai H. Chou et al.; The Chinook Hardware Software Co-Synthesis System; ACM; 6 pages; <https://dl.acm.org/citation.cfm?id=224491> (Year: 1995).*

Li et al., "An Automata—Theoretic Approach to Hardware/Software Co-verification", FASE 2010, LNCS 6013, pp. 248-262, 2010.

Bobaru et al., "Automated Assume-Guarantee Reasoning by Abstraction Refinement", CAV 2008, LNCS 5123, pp. 135-148, 2008.

Chen et al., "Automated Assume-Guarantee Reasoning through Implicit Learning", CAV 2010, LNCS 6174, pp. 511-526, 2010.

Andrews, "Co-Verification of Hardware and Software for ARM SoC Design", Embedded Technology Series, Elsevier, Newnes, 2005, pp. 1-287.

Kurshan et al., "Combining Software and Hardware Verification Techniques", Formal Methods in System Design, vol. 21, pp. 251-280, 2002.

Xie et al., "Component-Based Hardware/Software Co-Verification", 2006 4th IEEE/ACM International Conference on Formal Methods and Models for Co-Design, pp. 27-36.

Giannakopoulou et al., "Component Verification with Automatically Generated Assumptions", Automated Software Engineering, vol. 12, pp. 297-320, 2005.

Davis et al., "A Computing Procedure for Quantification Theory", J. ACM, vol. 7, No. 3, pp. 201-215, 1960.

Een et al., "An Extensible SAT-solver", SAT 2003, LNCS 2919, pp. 502-518, 2004.

Nguyen et al., "Formal Hardware/Software Co-Verification by Interval Property Checking with Abstraction", DAC 2011, Jun. 5-10, 2011, San Diego, California, USA, pp. 1-6.

Goldberg et al., "BerkMin: A Fast and Robust Sat-Solver", Design, Automation, and Test in Europe—The Most Influential Papers of 10 Years Date, pp. 465-478, Springer 2008.

Große et al., "HW/SW Co-Verification of Embedded Systems using Bounded Model Checking", GLSVLSI'06, Apr. 30-May 2, 2006, Philadelphia, PA, USA, pp. 43-48.

Huang, "Constructing Craig Interpolation Formulas", Computing Combinatorics (COCOON), ser. LNCS, vol. 959, Springer, 1995, pp. 181-190.

Jhala et al., "Interpolant-based Transition Relation Approximation", CoRR, vol. abs/0706.0523, 2007, pp. 1-17.

Krajicek, "Interpolation theorems, lower bounds for proof systems, and independence results for bounded arithmetic", The Journal of Symbolic Logic, vol. 62, No. 2, pp. 1-38 , 1991.

Li et al., "Efficient Reachability Analysis of Buchi Pushdown Systems for Hardware/Software Co-verification", CAV 2010, LNCS 6174, pp. 339-353, 2010.

McMillan, "Lazy Abstraction with Interpolants", CAV 2006, LNCS 4144, pp. 123-136, 2006.

McMillan, "Interpolation and SAT-Based Model Checking", CAV 2003, LNCS 2725, pp. 1-13, 2003.

Moskewicz et al., "Chaff: Engineering an Efficient SAT Solver", DAC 2001, Jun. 18-22, Las Vegas, Nevada, USA, pp. 530-535.

Pasareanu et al., "Learning to Divide and Conquer: Applying the L* Algorithm to Automate Assume-Guarantee Reasoning", Formal Methods in System Design, vol. 32, No. 3, pp. 175-205, Jan. 9, 2008.

Pudlak, "Lower bounds for resolution and cutting plane proofs and monotone computations", The Journal of Symbolic Logic, vol. 62, No. 3, pp. 1-20, 1997.

Silva et al., "GRASP—A New Search Algorithm for Satisfiability", ICC AD, AAM, 1996, pp. 220-227.

Sinha et al., "SAT-Based Compositional Verification Using Lazy Learning", CAV 2007, LNCS 4590, pp. 39-54, 2007.

Xie et al., "Translation-Based Co-Verification", MEMCODE, 2005, pp. 154-169.

Jain, "Verification using Satisfiability Checking, Predicate Abstraction, and Craig Interpolation", Sep. 2008, CMU-CS-08-146, pp. 1-297.

Xie et al., "Compositional Reasoning for Hardware/Software Co-verification", ATVA 2006, LNCS 4218, pp. 154-169, 2006.

Chockler et al., "Computing Mutation Coverage in Interpolation-based Model Checking", 2011 IEEE, pp. 1-14.

Kalavade et al., "A Hardware-Software Codesign Methodology for DSP Applications", 1993 IEEE, IEEE Design & Test of Computers, pp. 16-28.

Wolf, "Hardware-Software Co-Design of Embedded Systems", Invited Paper, Proceedings of the IEEE, vol. 32, No. 7, Jul. 1994, pp. 967-989.

Ernst et al., "Hardware-Software Cosynthesis for Microcontrollers", 1993 IEEE, IEEE Design & Test of Computers, pp. 64-75.

Thomas et al., "A Model and Methodology for Hardware-Software Codesign", 1993 IEEE, IEEE Design & Test of Computers, pp. 6-15.

De Micheli, "Hardware/Software Co-Design", Invited Paper, 1997 IEEE, Proceedings of the IEEE, vol. 85, No. 3, Mar. 1997, pp. 349-365.

Wolf, "A Decade of Hardware/Software Codesign", Cover Feature, Published by the IEEE Computer Society, 2003 IEEE, pp. 38-41.

IBM: List of IBM Patents or Patent Applications Treated as Related (Appendix P), Apr. 18, 2018, 2 pages.

* cited by examiner

METHOD FOR VERIFYING HARDWARE/SOFTWARE CO-DESIGNS

BACKGROUND

The present invention relates to a formal verification of hardware and software co-designs such as embedded systems.

In general, formal verification of hardware and software designs in the design phase is customary. It is standard to use formal verification in validating complex hardware designs based on a hardware model described in a hardware description language. Further, the importance of software verification has recently increased as software codes are getting more and more complex.

SUMMARY

According to a first aspect a computer implemented method for formally verifying a hardware/software co-design is provided, including the steps of: providing a co-design including a first model and a second model, the first model is one of a hardware model and a software model, and the second model is the other one of the hardware model and the software model, providing a safety property expected to be satisfied by the co-design, combining an abstraction of the first model and the safety property to obtain an abstracted first model, composing the abstracted first model and the second model to obtain a composed model, checking if the composed model satisfies the safety property, and signaling that the hardware/software co-design violates the safety property if the safety property is violated in the composed model.

According to a further aspect, a computer implemented method for formally verifying a hardware/software co-design is provided, including the steps of: providing in a co-design a first model and a second model, the first model is one of a hardware model and a software model, and the second model is the other one of the hardware model and the software model, providing a safety property expected to be satisfied by the co-design, combining an abstraction of the first model and the safety property to obtain an abstracted first model, generating an abstracted second model, composing the abstracted first model and the abstracted second model to obtain a composed model, checking if the composed model satisfies the safety property, and signaling that the hardware/software co-design violates the safety property if the safety property is violated in the composed model.

Hardware/software co-designed systems may be decomposed in a hardware component described as a hardware (first/second) model and a software component described as a software (first/second) model. In a verification process, the hardware and the software models of a hardware/software co-design are verified with respect to a safety property to be proved.

As a means for refinement (abstraction), an interpolation-based transition relation abstraction and refinement may be applied.

One general approach may include performing model checking of the composed hardware and software models. Given the complexity of designs of hardware and software, the verification of the composed hardware and software models may be complicated and therefore time-consuming and requires high performance verification computing resources. One advantage of the above methods may be that model checking of the composed concrete (non-abstracted) hardware and (non-abstracted) software model is avoided.

According to the above method model checking may only be performed on a composed model in which at least one of a hardware model or a software model is abstracted using the transitional relation abstraction. Hence, the verification time for complex hardware/software co-design may be essentially reduced.

Furthermore, the abstractions of the first model and the second model may be refined, particularly to a lower abstraction level/less abstracted level, as long as the composed model does not satisfy the safety property, the steps of composing the abstracted first model and the second model and of checking if the composed model satisfies the safety property are performed based on the refined first model and the refined second model, respectively.

It may be provided that the abstractions of the first model and the second model are refined, as long as the error trace resulting from the step of checking in a model checker is not real trace in the non-abstracted first model and non-abstracted second model, respectively.

Particularly, the abstraction of the first model is refined, as long as the error trace resulting from the step of checking in a model checker is not real.

According to an embodiment refining may be performed by means of interpolation, particularly Craig interpolation.

It may be provided that the model checker provides a counterexample resulting from the step of checking, where signaling that the co-design violates the safety property is performed only if the counterexample projected on the non-abstracted first model and the non-abstracted second model is a valid trace in the first model and the second model, respectively.

It may be checked if the counterexample projected on the non-abstracted first model and the non-abstracted second model is a valid trace in the first model and the second model, respectively, is performed using a SAT solver.

Furthermore, the hardware model may be described by a hardware-centric language, particularly by a hardware description language.

The software model may be described by a software-centric language, particularly by a programming language.

Alternatively or additionally, composing the abstracted first model and the second model may comprise translating the abstracted first model and the safety property into a property specification language which is capable to describe a model environment and properties and by performing a model check using the environment described in a property specification language for the verification of the abstracted or non-abstracted second model, respectively.

According to a further aspect a system for formal verification of a hardware/software co-design is provided, configured to perform any of the methods described above.

BRIEF DESCRIPTION OF THE DRAWINGS

Embodiments of the present invention are described in more detail in conjunction with the accompanying drawings in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates to a formal verification of hardware and software co-designs such as embedded systems.

A growing problem in hardware/software verification is the combined verification of co-designs of hardware including hardware-specific software (firmware) that interacts with it. The results of separately applying techniques for the formal verification of hardware and software are not satisfying. The hardware/software interface usually acts as a boundary which needs to be synchronized. However, such a synchronization may not be reflected in separate hardware and software verification attempts. Furthermore, the interfaces are usually described in different description languages for hardware and software verification, while the consistency of the semantics of the descriptions of the interfaces is usually not approved. In general, the interaction of hardware interfaces with software interfaces for embedded systems is so complex that validation of the co-design by verifying the hardware and software interfaces separately may not lead to reliable results. A common approach to designing embedded software uses a software-modelled hardware in which the software code may be developed, validated and tested.

Embedded systems may typically include a hardware component in which a hardware-specific software code (firmware) is carried out. When designing such an embedded system, the hardware component may be described in a hardware-centric language such as a hardware description language (HDL), e.g. VHSIC HDL (Very High Speed Integrated Circuit Hardware Description Language) which may be verified by tools such as RuleBase©, SixthSense© and the like. The hardware-centric language description may include the functions of the hardware component (hardware design) of the embedded system in the form of a hardware model as a part of the system model for which formal verification may be performed.

A software program code may be encoded in a software-centric language. The software program code may be written in any known programming language including, for example, C++.

Hardware components and software interact with each other via one or more interfaces (hereinafter "interfaces"). In the common approach of separate verification of the hardware design (hardware model) and the software code (software model), the interfaces may be provided as models in both the hardware description language and the programming language. This may result in an inconsistency.

Therefore, by performing a verification of a hardware model and a software model in a combined manner, embodiments of the present disclosure may, among other potential benefits, allow a natural decomposition of the co-design system. As such, the present embodiment has the capacity to avoid the state-space explosion problem typical in current hardware/software systems.

Figure 1:
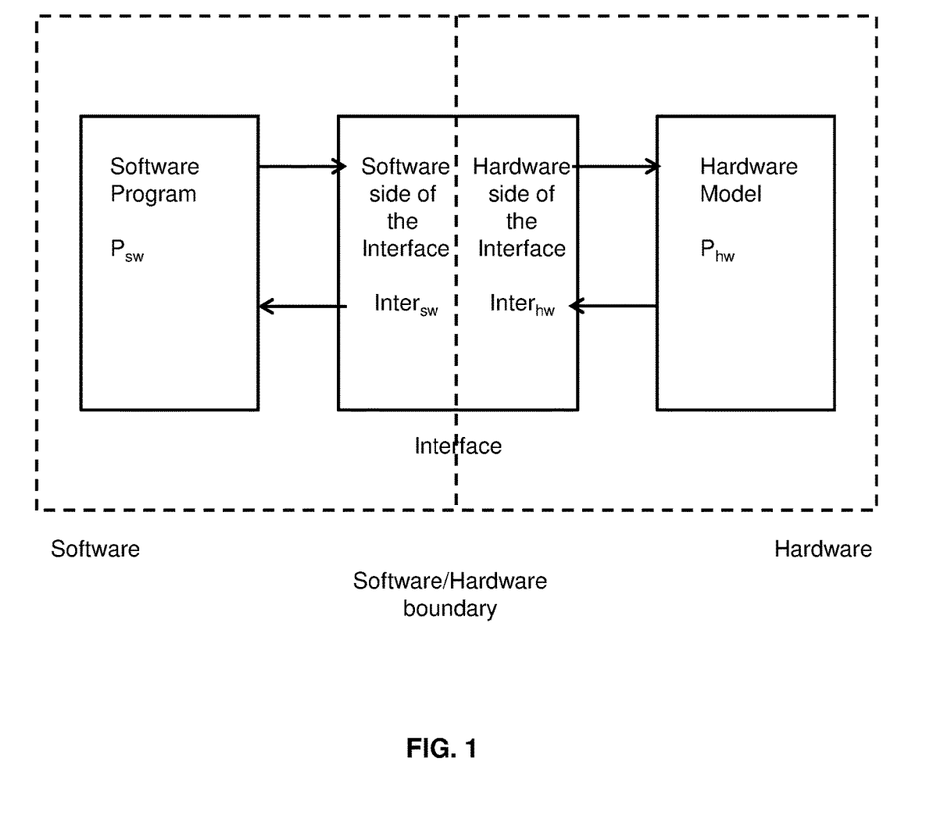
FIG. 1 is an illustration of a hardware/software co-design coupled with an interface to establish a communication between the models, according to an embodiment of the present disclosure.

Referring now to FIG. 1, a hardware/software co-design coupled with an interface to establish a communication between models is shown, according to an embodiment of the present disclosure. In general, the hardware/software co-design may include a software model, a hardware model, and interface models to establish a communication between the models. The interface models may include a software interface model and a hardware interface model. The software model sw and the software interface model $Inter_{sw}$ may be regarded as an environment of the hardware and translated into Property Specification Language (PSL). The PSL may be typical and well known to those skilled in the art and it may be used to describe the environment and its properties. By means of the PSL a conventional model checker, like RuleBase© may perform composition of the hardware and software models. As a result, a common PSL test bench may contain the software code sw=$<P_{sw}, Inter_{sw}>$ modelled in PSL which forms the environment for the hardware. The abstraction may be given as:

$$\widehat{sw} = (\hat{P}_{sw}, Inter_{sw})$$

Model checkers like RuleBase© may use information from a restricted PSL environment to automatically reduce/abstract the size of the model to be verified, i.e. the composition is taken care of automatically in the model checker. To help abstractions, some signals in the environment may be set to constant values, or may be restricted to some other simple behavior. This reduction is usually done by using vmodes which is a construct in PSL. The safety property ø to be verified may also be modeled in PSL using assertions.

Hardware model checkers, including RuleBase©, may use/compose the environment described in the PSL test bench, the hardware model and check the safety property specified in PSL. The model checking may be performed (e.g. step S5 in FIG. 2) to approve if the composed hardware and software model fulfill the given safety property, and it may return a corresponding YES/NO answer and a counterexample c in case of a failure (NO) as will be described in detail below. A counterexample c may be described using the variables of the abstracted software model $\widehat{sw}$, i.e. $\hat{P}sw$ and the software interface $Inter_{sw}$ and the hardware hw.

The counterexample c may be described using the variables of the software model $\widehat{sw}$, i.e. $\hat{P}sw$ and the software interface model $Inter_{sw}$ and the hardware model hw. The counterexample may be either projected on the variables of $P_{hw}$ or $P_{sw}$ and $Inter_{sw}$ and simulated on the same.

Figure 2:
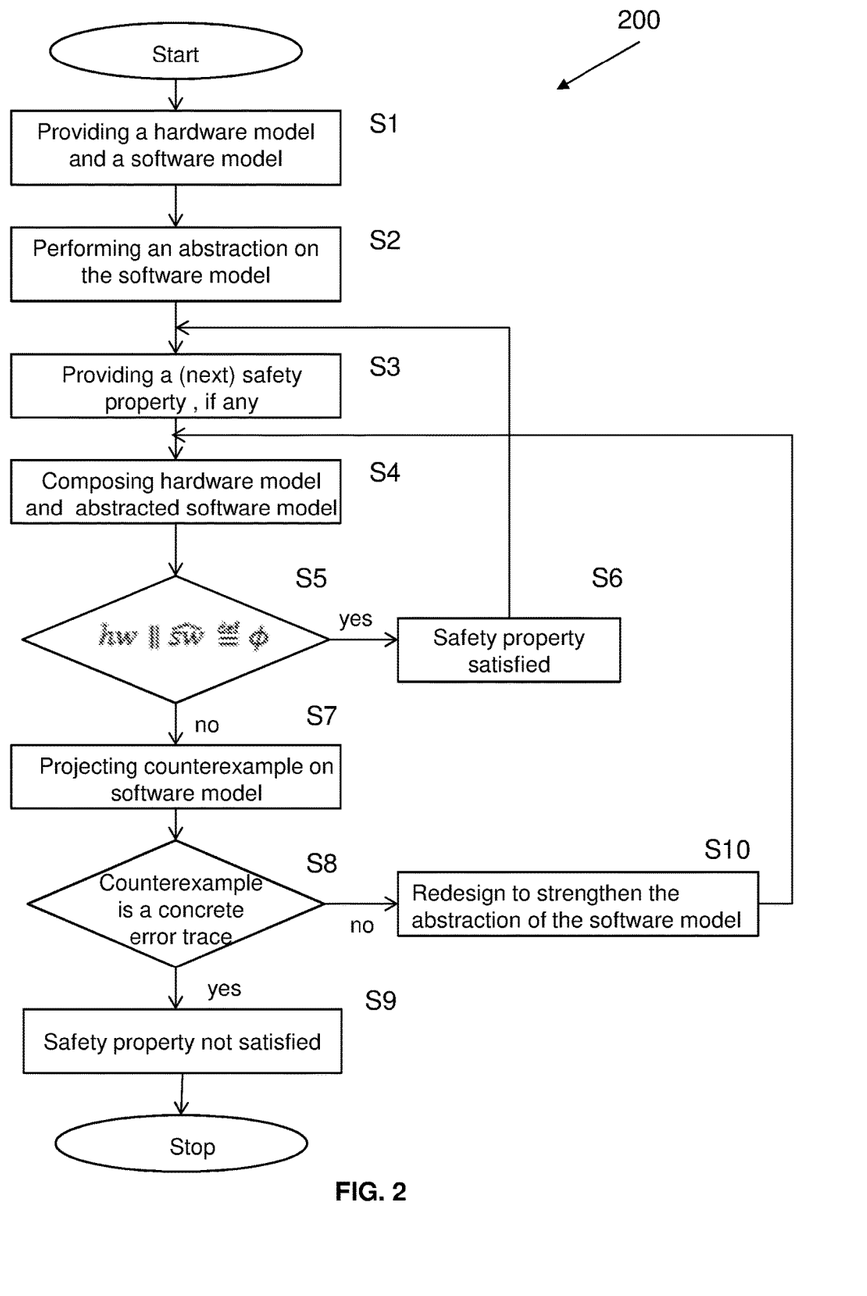
FIG. 2 is a flowchart illustrating a method for formal verification of hardware/software co-designs, according to an embodiment of the present disclosure.

Referring now to FIG. 2, a flowchart 200 describing the steps of a method for formal verification of hardware/software co-designs is shown, according to one embodiment of the present disclosure. In this embodiment, a hardware model described in a hardware centric language, e.g. in HDL, and a software model described in a common software-centric language are further specified.

In step S1, the hardware model and the software model may be provided in respective description languages. The hardware model may be described or be translated (by the model checker) into the following representation:

$$hw = (I_{hw}, T_{hw})$$

where $I_{hw}$ defines a set of initial states of the hardware model and $T_{hw}$ a transition relation starting from $I_{hw}$.

Furthermore, the software model may be described as:

$$sw = (I_{sw}, T_{sw})$$

where $I_{sw}$ defines the set of initial states of the software and $T_{sw}$ the transition relation starting from $I_{sw}$.

In step S2, a software abstraction may be created from the software model sw being defined as:

$$\widehat{sw} = (I_{sw}, \hat{T}_{sw})$$

with $\hat{T}_{sw}$=TRUE to begin with, where $\hat{T}_{sw}$ is defined as the abstracted transition relations.

In step S3, a safety property ø may be specified or provided. The safety property ø may define the conditions which should be satisfied by the combined hardware/software model. The safety property ø is usually defined e.g. by an expert so that design flaws may be revealed.

In step S4, the hardware model HW and the abstracted software model $\widehat{SW}$ may be composed. More specifically, the hardware model and the abstracted software model may be analyzed in a combined manner so that it is possible to check if the combined hardware/software model satisfies the safety property ø.

If in step S5 of model checking it is found that the composed hardware and software models fulfill the safety property (alternative: Yes), it is signaled in step S6 that also the composition of the hardware model and the non-abstracted software model fulfill the safety property as:

$$hw \| \widehat{SW} =_{\emptyset} \rightarrow hw \| sw =_{\emptyset}$$

Thereafter, the method is continued by step S3.

Otherwise (alternative: No), it has to be further checked whether or not the counterexample/error trace returned by the model checker is a concrete/real error trace, i.e., if the error trace is due to the abstraction of the software and the method continues to step S7.

In step S7, the counterexample c is projected on the (non-abstracted) software model sw by restricting the state description in c to variables of sw=$(I_{sw}, T_{sw})$. In consequence, a sequence of software states as a counterexample projection $c_{sw}$ may be obtained:

$$c_{sw} = s_0, s_1, s_2, \ldots, s_k.$$

It is checked in step S8, if the counterexample projection $c_{sw}$ of the counter-example c on the software model sw provides a valid trace in the software. This may be performed by simulating $c_{sw}$ on the software using a standard SAT solver as known in the art.

SAT solvers are known for resolving Boolean satisfiability problems which are decision problem for determining if a satisfying assignment for a given Boolean formula exists.

A Boolean formula may be generally converted to Conjunctive Normal Form (CNF) or Disjunctive Normal Form (DNF). A propositional formula is in CNF if it is a conjunction of disjunctions of literals (x' or x" where x', x" are Boolean disjunctive clauses). For example, the CNF formula:

$$(x_1 \vee \hat{x}_2) \wedge (x_3 \vee x_2) \wedge \hat{x}_3 \wedge \hat{x}_1$$

In the above formula, $x_1 \vee \hat{x}_2$, $x_3 \vee x_2$, $\hat{x}_3$, $\hat{x}_1$ are Boolean clauses. When a Boolean formula is unsatisfiable, most SAT solvers may generate a proof demonstrating its unsatisfiability. The proof may be represented as a counterexample.

If the condition of step S8 is fulfilled (alternative: YES), the counter-example c is a concrete error trace in the hardware/software co-design. This outcome leads to a signaling that the safety property is not satisfiable in step S9 and to a stop of the method.

Otherwise (alternative: NO), the abstraction $\hat{T}_{sw}$ leads to refining in step S10. Step S10 provides to strengthen the abstraction of the software model as a try to eliminate the error trace revealed by the counterexample.

The refining might be performed by using Craig interpolation.

Assume that $s_k(k')$ is the first invalid state reached in the software model sw. The SAT solver can be used to return refutation proof demonstrating the unsatisfiability of the following formula:

$$BMC_k \stackrel{\text{def}}{=} I(0) \wedge T_{sw}(0,1) \wedge T_{sw}(1,2) \wedge \ldots \wedge T_{sw}(k'-1, k') \wedge s_k(k')$$

The refutation proof can be used to refine the abstraction of the software model using interpolation.

Craig Interpolation is well known in the art. Given a propositional formula β, let Var(β) denote the set of propositional variables occurring in β.

As is defined, an interpolant for a pair of inconsistent propositional formulas (A;B) is a propositional formula I such that:
1. A→I,
2. I and B are inconsistent, and
3. Var(I)⊆Var(A)∩Var(B).

As an example, it is given an unsatisfiable propositional formula A∧B such that A=$(x_1 \vee \hat{x}_2)$ and B=$(x_3 \vee x_2) \wedge \hat{x}_3$. The interpolant for the unsatisfiable pair (A;B) is: $\hat{x}_2$. Simplifying A and B, A=$(\hat{x}_1 \wedge \hat{x}_2)$ and B=$(x_2 \wedge \hat{x}_3)$, it can be seen that A→$\hat{x}_2$ is valid and B∧$\hat{x}_2$ is false.

Interpolants may be computed efficiently from resolution refutations. Different methods to compute interpolants from proofs are known in the art.

Herein a slightly extended notion of interpolation is used. Given an indexed set of formulas A=$a_1; a_2; \ldots; a_n$ such that ∧A is unsatisfiable, a symmetric interpolant for A is an indexed set of formulas $\hat{A} = \widehat{a_1}; \widehat{a_2}; \ldots; \widehat{a_n}$ such that $a_i \rightarrow \widehat{a_i}$; and $\widehat{a_1} \wedge \widehat{a_2} \wedge \ldots \wedge \widehat{a_n} = \wedge \hat{A}$ is unsatisfiable. Moreover, $\widehat{a_i}$; is over the common variables in $a_i$ and A\$a_i$.

In particular, the interpolants are completed between the following pairs:

| Interpolant | A | B |
|---|---|---|
| $\hat{T}_{sw}(0, 1)$ | $T_{sw}(0, 1)$ | $I(0) \wedge T_{sw}(1, 2) \wedge \ldots \wedge T_{sw}(k'-1, k') \wedge s_k(k')$ |
| $\hat{T}_{sw}(1, 2)$ | $T_{sw}(1, 2)$ | $I(0) \wedge T_{sw}(0, 1) \wedge \ldots \wedge T_{sw}(k'-1, k') \wedge s_k(k')$ |
| . | | |
| . | | |
| $\hat{T}_{sw}(k'-1, k')$ | $T_{sw}(k'-1, k')$ | $I(0) \wedge T_{sw}(0, 1) \wedge \ldots \wedge T_{sw}(k'-2, k'-1) \wedge s_k(k')$ |

The interpolants are shifted in time so that all interpolants are over variables of timeframe 0 and 1. Thus, the transition relation is:

$$\hat{T}_{sw} = \bigwedge_{i=0}^{i=k'} \hat{T}(i, i+1)^i$$

where i corresponds to the number of time steps by which the interpolant I is shifted.

From the properties of symmetric interpolants, it is known that $\hat{T}_{sw}$ admits no path of length k' to sk'. The refined transition relation of $\widehat{sw}$ is:

$$\hat{T}_{sw} = \hat{T}_{sw} \wedge \dot{T}_{sw}$$

A more detailed explanation for the abstraction, the creation of the error trace simulation and the strengthening of the abstracted software model is given using a simple example. A software model having the following transition relation is given as follows:

y=x z=y assert(x=z)

with the transition relations y1→x0 and z1→y1.

The transition relations may be abstracted, e.g. by a true \*-function, where any variable can take any value. The possible counterexample c may be $$x0 = 5 \quad y1 = *$$
$$y0 = * \;\rightarrow\; z1 = 7$$
$$z0 = * \quad x1 = *$$

Now the counter-example is simulated on the original transition relation as given above:

$$x_0=5 \wedge y_1=x_0 \wedge z_1=y_1 \wedge z_1=7$$

where it is checked if the above formula is unsatisfiable. If it is unsatisfiable indicating that the counterexample is not a real execution trace in the original software model.

The abstraction needs to be strengthened/refined to eliminate the counterexample. One possible way to strengthen the transition relation is using interpolation. As explained before.

$$\underbrace{x_0 = 5 \wedge y_1 = x_0 \wedge}_{A} \underbrace{z_1 = y_1 \wedge z_1 = 7}_{B}$$

An interpolant is formula I
1. A→I,
2. B∧I→⊥
One possible interpolant is z1=x0

$$y_1=x_0 \wedge z_1=y_1 \rightarrow z_1=x_0$$

$$z_1=x_0 \wedge x_0=5 \wedge z_1=7 \rightarrow \bot$$

Hence, the strengthened transition relation can be found as $z_1=x_0$. In the new strengthened system, the assertion assert (x=z) is never violated. The assignment y=x is abstracted away.

Figure 3:
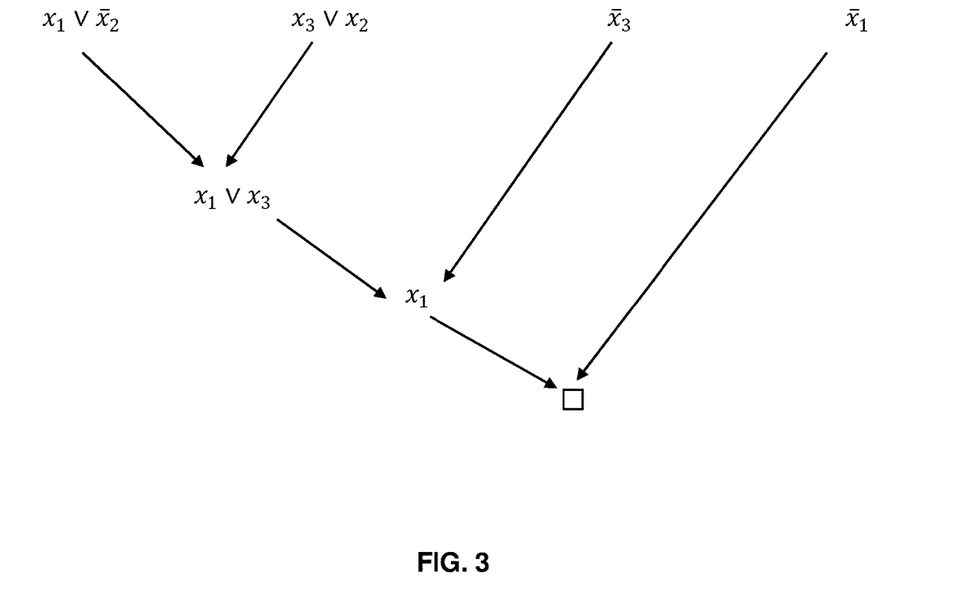
FIG. 3 is an illustration of a resolution refutation of an exemplary CNF formula, according to an embodiment of the present disclosure.

Referring now to FIG. 3, a resolution refutation of the previously described CNF formula including a directed acyclic graph is shown, according to an embodiment of the present disclosure. The internal vertices are generated according to the resolution principle—an assignment satisfying the Boolean clauses $\mathcal{C} \vee x$ and $\mathcal{D} \vee \hat{x}$ also satisfies $\mathcal{C} \vee \mathcal{D}$. For example, the resolvent of $\mathcal{C}=(x_1 \vee \hat{x}_2)$ and $\mathcal{D}=x_3 \vee x_2$ is $x_1 \vee x_2$. The sink of a resolution refutation is an empty clause, denoted by □.

Particularly, to check if a counterexample is a real trace in sw the satisfiability of the following formula is checked:

$$BMC_k \stackrel{def}{=} I(0) \wedge TT_{sw}(0,1) \wedge T_{sw}(1,2) \wedge \ldots \wedge T_{sw}(k-1,k) \wedge s_0(0) \wedge \ldots \wedge s_k(k)$$

where BMC corresponds to a Bounded Model Checking.

Bounded Model Checking (BMC) leverages the success of fast propositional SAT solvers to model checking. The basic idea behind verifying a system M using Bounded Model Checking is to check if there exists a trace in the system M of a bounded length k that reaches a faulty state.

In detail, consider a set of states Q, a transition relation T, a set of failure states F, and a constant k≥1. A Bounded Model Checking instance $BMC_k$ from a state Q with bound k checks if Q reaches F in k steps. The corresponding formula $BMC_k$ may be defined as follows:

$$BMC_k \stackrel{def}{=} Q(s_0) \wedge T(s_0,s_1) \wedge T(s_1,s_2) \wedge \ldots \wedge T(s_{k-1}, s_k) \wedge F(s_1) \vee \ldots \vee F(s_k)$$

If the $BMC_k$ instance is satisfiable, F is reachable from a state in Q in k steps. If $BMC_k$ is unsatisfiable, F is not reachable from a state in Q in ≤k steps. An instance of the BMC problem, denoted as $BMC_k(M;f)$ where f is a formal property (F=:f), checks if $M \vdash_k \varnothing$ where $\vdash_k$ is the satisfaction relation from the initial states of M up to bounded depth k.

To check the satisfiability of $BMC_k$, fast propositional SAT solvers are used for which $BMC_k$ is converted into an equisatisfiable CNF formula.

Figure 4:
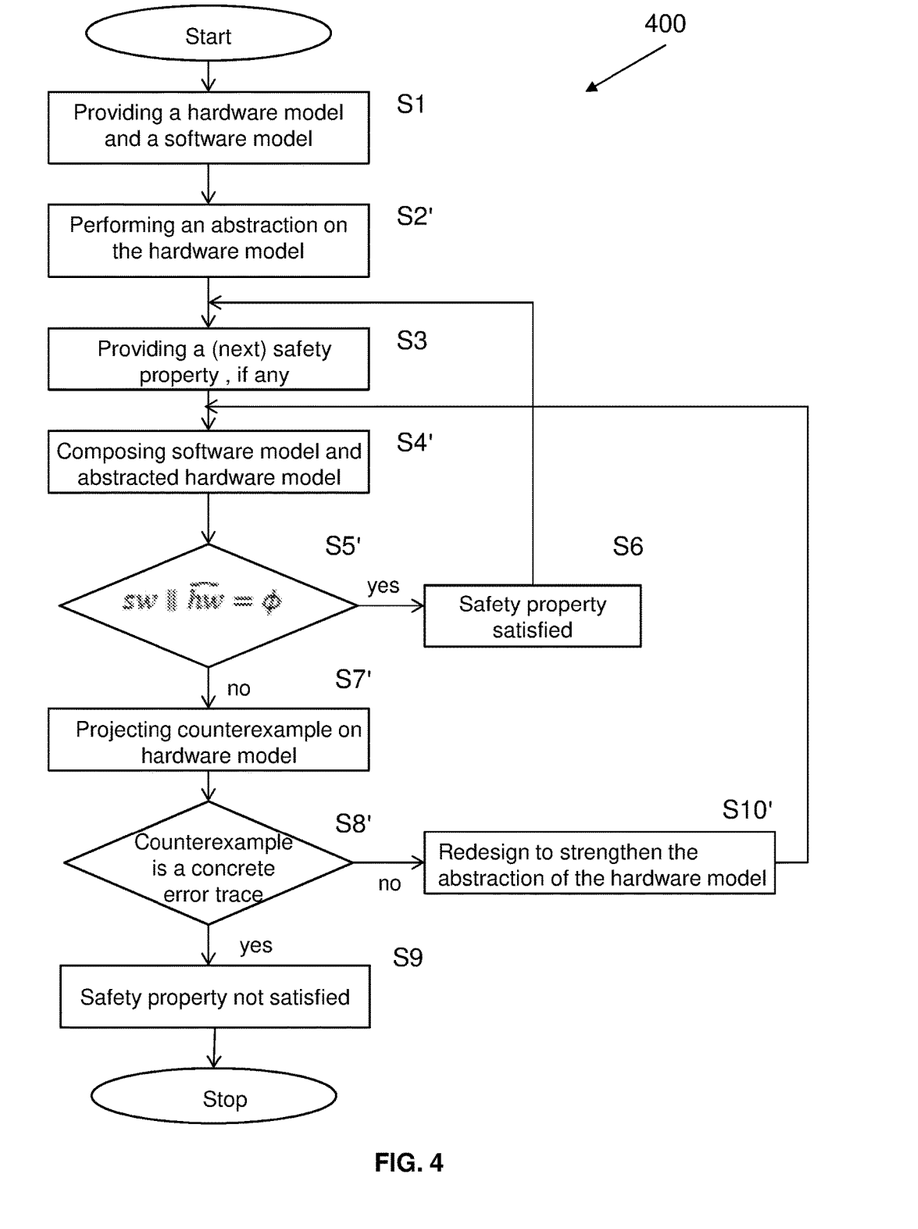
FIG. 4 is a flowchart illustrating a first alternate method for formal verification of hardware/software co-designs, according to an embodiment of the present disclosure.

Referring now to FIG. 4, a flowchart 400 describing the steps of a first alternate method for formal verification of hardware/software co-designs is shown, according to an embodiment of the present disclosure.

It should be noted that the method described above with reference to FIG. 2 is described with the software model being abstracted and composed with the hardware model. In this embodiment, the hardware model is abstracted and composed with a non-abstracted software model, as described in the flowchart 400. Hence, steps S2', S4', S5', S7', S8', and S10' differ from the corresponding steps S2, S4, S7, S8, and S10 of the embodiment described in FIG. 2.

In step S1, the hardware model and the software model are provided in respective description languages. Then, at step S2', an abstraction on the hardware model is performed.

In step S3, a safety property ø is specified or provided. The safety property ø may define the conditions which should be satisfied by the combined hardware/software model as described above.

In step S4', the software model sw and the abstracted hardware model $\widehat{hw}$ may be composed. More specifically, the software model and the abstracted hardware model may be analyzed in a combined manner so that it is possible to check if the combined hardware/software model satisfies the safety property ø.

If in step S5' of model checking it is found that the composed hardware and software models fulfill the safety property (alternative: Yes), it is signaled in step S6 that also the composition of the software model and the non-abstracted hardware model fulfill the safety property. Thereafter, the method is continued by step S3.

Otherwise (alternative: No), it has to be further checked whether or not the counterexample/error trace returned by the model checker is a concrete/real error trace, i.e., if the error trace is due to the abstraction of the hardware and the method continues to step S7'.

In step S7', the counterexample c is projected on the (non-abstracted) hardware model hw by restricting the state description in c to variables of hw Next, if the condition of step S8' is fulfilled (alternative: YES), the counter-example c is a concrete error trace in the hardware/software co-design. This outcome leads to a signaling that the safety property is not satisfiable in step S9 and to a stop of the method.

Otherwise (alternative: NO), the abstraction $\hat{T}_{hw}$ leads to refining in step S10'.

Figure 5:
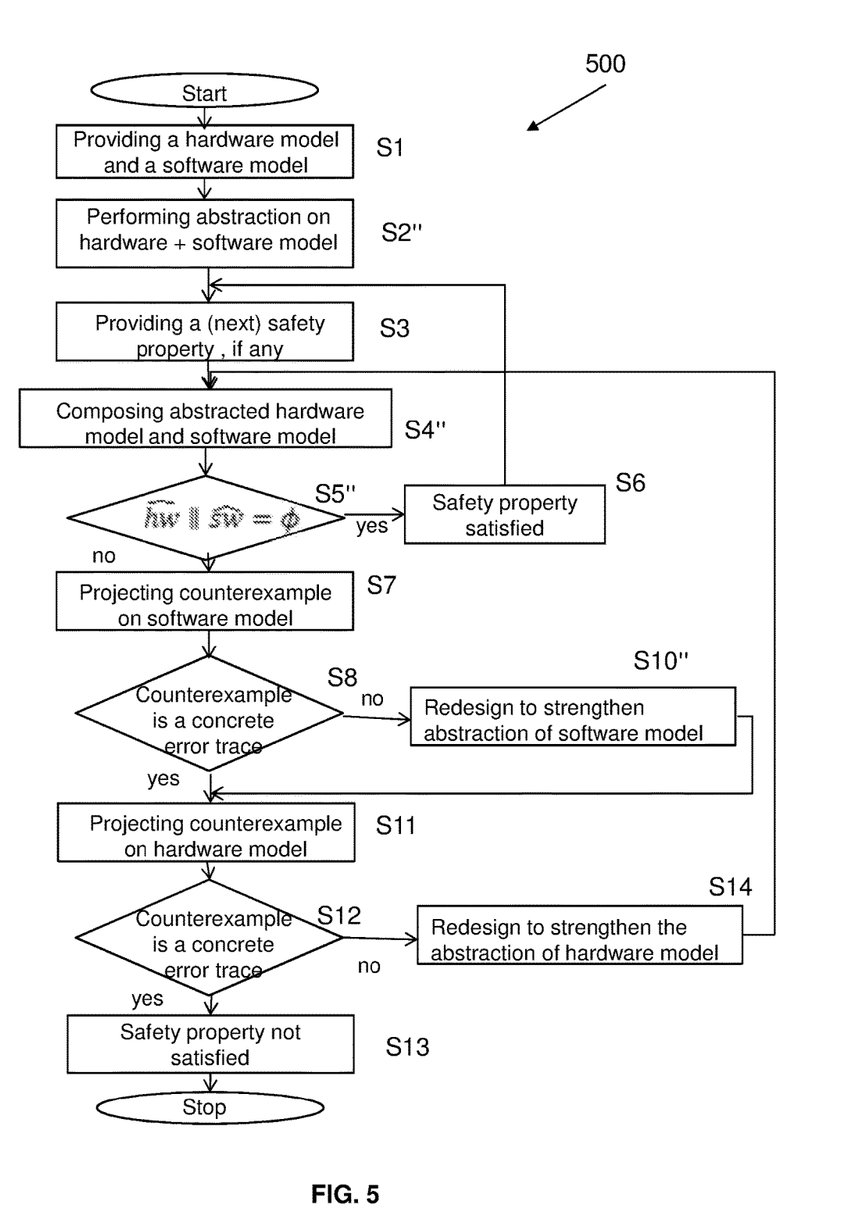
FIG. 5 is a flowchart illustrating a second alternate method for formal verification of hardware/software co-designs, according to an embodiment of the present disclosure.

Referring now to FIG. 5, a flowchart 500 describing the steps of an alternate method for formal verification of a hardware/software co-design is shown, according to an embodiment of the present disclosure. More specifically, the present embodiment may combine the described methods of FIG. 2 and FIG. 4 by using an abstracted hardware model and an abstracted software model. In an amended step S2" similar to steps S2 (FIG. 2) and S2" (FIG. 4) of previously described embodiments an initial abstraction of the software model sw and the hardware model hw is performed.

In the amended step S4", similar to step S4 the abstracted hardware model $\widehat{hw}$ and the abstracted software model $\widehat{sw}$ are composed, i.e. the abstracted hardware model $\widehat{hw}$ and the abstracted software model $\widehat{sw}$ are combined or analyzed in a combined manner so that it is possible to check if the combined abstracted hardware/software model satisfies the safety property ø, as follows:

$$\widehat{hw} \| \widehat{sw} = \emptyset$$

If in amended step S5" (similar to steps S5 and S5' in FIGS. 2 and 4, respectively) of model checking it is found that the composed abstracted hardware and abstracted software models fulfill the safety property (alternative: Yes), it is signaled in step S6 that the composition of the non-abstracted hardware model and the non-abstracted software model fulfill the safety property as:

$$\widehat{hw} \| \widehat{sw} = \emptyset \rightarrow hw \| sw = \emptyset$$

Steps S7 and S8 are similar to the corresponding steps of the embodiment of FIG. 2.

If the condition of step S8 is fulfilled (alternative: YES), it has turned out that the counter-example c is a concrete error trace in the software model. This outcome leads to a continuation of the method in step S11.

Otherwise (alternative: NO), the abstraction $\hat{T}_{sw}$ of the software model sw leads to refining in step S10". Step S10" provides to strengthen the abstraction of the software model as to eliminate the error trace revealed by the counterexample. Thereafter the method is continued by step S11.

In step S11 (similar to the step S7' of the embodiment of FIG. 4), the counterexample c is projected on the (non-abstracted) hardware model hw by determining the states of the hardware by applying c in hw=($I_{hw}$, $T_{hw}$). One obtains the a number of hardware states as a counterexample projection $c_{hw}$:

$$c_{hw} = s'_0, s'_1, s'_2, \ldots, s'_k.$$

It is checked in step S12, if the counterexample projection $c_{hw}$ of the counter-example c on the hardware model hw provides a valid trace in the hardware. This may be performed by a standard SAT solver as known in the art.

If the condition of step S12 is fulfilled (alternative: YES), it has turned out that the counter-example c is a concrete error trace in the hardware module. This outcome leads to a signaling that the safety property is not satisfiable in step S13 and to a stop of the method.

Otherwise (alternative: NO), the abstraction $\hat{T}_{hw}$ leads to refining in step S14. Step S14 provides to strengthen the abstraction of the hardware model (as a try) to eliminate the error trace revealed by the counterexample. Then, the method is continued with step S4".

The present invention may be a system, a method, and/or a computer program product. The computer program product may include a computer readable storage medium (or media) having computer readable program instructions thereon for causing a processor to carry out aspects of the present invention.

Figure 6:
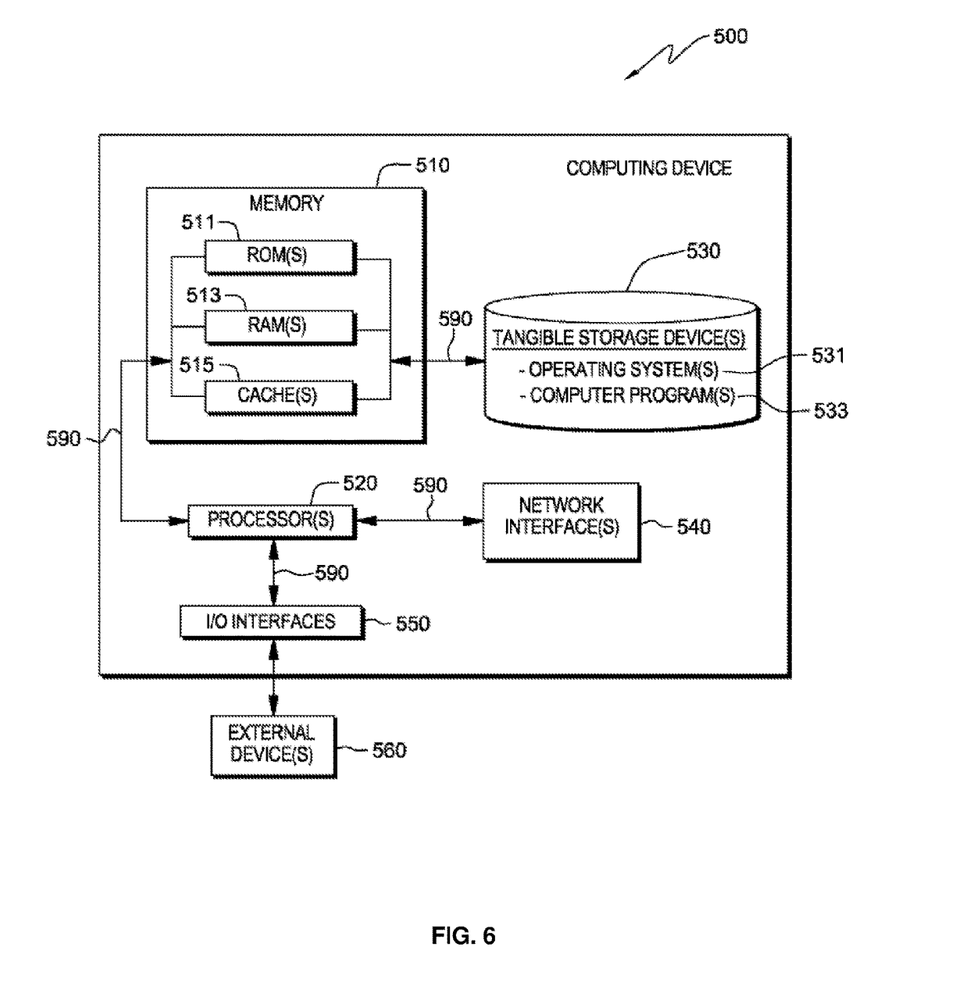
FIG. 6 is a diagram illustrating components of a system for executing the methods illustrated in FIGS. 2, 4 and 5, according to an embodiment of the present disclosure.

Referring now to FIG. 6, computing device 500 includes processor(s) 520, memory 510, tangible storage device(s) 530, network interface(s) 540, and 110 (input/output) interface(s) 550. In FIG. 6, communications among the above mentioned components of computing device 500 are denoted by numeral 590. Memory 510 includes ROM(s) (Read Only Memory) 511, RAM(s) (Random Access Memory) 513, and cache(s) 515.

One or more operating systems 531 and one or more computer programs 533 reside on one or more computer readable tangible storage device(s) 530. In the exemplary embodiment, the computer implemented method for formally verifying a hardware/software co-design in form of a software resides on one or more computer-readable tangible storage device(s) 530.

Computing device 500 further includes 110 interface(s) 550. 110 interface(s) 550 allow for input and output of data with external device(s) 560 that may be connected to computing device 500. Computing device 500 further includes network interface(s) 540 for communications between computing device 500 and a computer network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, and micro-code) or an embodiment combining software and hardware aspects that may all generally be referred to herein as a "circuit," "module" or "system."

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to the processor 520 of the general purpose computing device 500, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored as computer readable storage medium in the computer readable tangible storage device(s) 530 that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for formally verifying a hardware/software co-design, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   providing in a co-design, a first model, and a second model, wherein the first model is one of a hardware model, and the second model is one of a software model, or vice versa;
   performing an abstraction on the first model, wherein the abstraction comprises refining the first model to a lower abstraction level;
   specifying a safety property comprising one or more conditions to be satisfied by a composed hardware/software model;
   combining the abstraction of the first model and the safety property to obtain an abstracted first model;
   translating the abstracted first model and a corresponding interface model into a Property Specification Language, wherein the Property Specification Language is capable of describing a model environment for the second model;
   based on the described model environment, composing, by a model checker, the abstracted first model and the second model to obtain the composed hardware/software model, wherein the model checker automatically composes the abstracted first model and the second model using a construct in the Property Specification Language;

verifying whether the composed hardware/software model satisfies the safety property;

in response to the composed hardware/software model not satisfying the safety property, projecting, by the model checker, a counterexample on the first model, wherein the counterexample is projected on variables of the abstracted first model, the interface model, and the second model such that a sequence of model states is obtained as a consequence of projecting the counterexample;

verifying whether the counterexample projected on the first model comprises a real error trace in the first model;

based on the counterexample being a real error trace, signaling that the hardware/software co-design violates the safety property; and based on the counterexample not being a real error trace, refining the abstraction of the first model to eliminate the error trace.

2. The computer system according to claim 1, further comprising:

in response to the composed hardware/software model satisfying the safety property, signaling that the hardware/software co-design fulfills the safety property.

3. The computer system according to claim 1, wherein the abstraction of the first model is refined, as long as an error trace resulting from checking in the model checker is not a real error trace.

4. The computer system according to claim 1, wherein refining the first model is performed by means of interpolation, particularly Craig interpolation.

5. The computer system according to claim 1, wherein verifying whether the counterexample projected on the first model comprises a real error trace in the first model comprises using Bounded Model Checking to leverage the success of fast propositional SAT solvers.

6. The computer system according to claim 1, wherein the hardware model is described by a hardware-centric language, particularly by a hardware description language, and the software model is described by a software-centric language, particularly by a programming language.

7. The computer system according to claim 1, wherein composing the abstracted first model and the second model comprises composing of the abstracted first model and an abstracted second model.

8. The computer system according to claim 1, wherein translating the abstracted first model further comprises:

performing a model check using the model environment described in the property specification language for the verification of the abstracted second model or a non-abstracted second model, respectively.

9. The computer system according to claim 1, wherein the model checker comprises conventional model checkers to compose the model environment described by the Property Specification Language and check the safety property.

10. A computer system for formally verifying a hardware/software co-design, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

providing in a co-design, a first model, and a second model, wherein the first model is one of a hardware model, and the second model is one of a software model, or vice versa;

performing an abstraction on the first model, wherein the abstraction comprises refining the first model to a lower abstraction level;

specifying a safety property comprising one or more conditions to be satisfied by a composed hardware/software model;

combining the abstraction of the first model and the safety property to obtain an abstracted first model;

performing an abstraction on the second model to generate an abstracted second model, wherein the abstraction comprises refining the second model to a lower abstraction level;

translating the abstracted first model and a corresponding interface model into a Property Specification Language, wherein the Property Specification Language is capable of describing a model environment for the abstracted second model;

based on the described model environment, composing, by a model checker, the abstracted first model and the abstracted second model to obtain the composed hardware/software model, wherein the model checker automatically composes the abstracted first model and the abstracted second model using a construct in the Property Specification Language;

verifying whether the composed hardware/software model satisfies the safety property;

in response to the composed hardware/software model not satisfying the safety property, projecting, by the model checker, a counterexample on the first model and the second model, wherein the counterexample is projected on variables of the abstracted first model, the interface model, and the second model such that a sequence of model states is obtained as a consequence of projecting the counterexample;

verifying whether the counterexample projected on the first model and the second model comprises a real error trace in the first model and the second model;

based on the counterexample being a real error trace, signaling that the hardware/software co-design violates the safety property; and based on the counterexample not being a real error trace, refining the abstraction of the first model to eliminate the error trace.

11. The computer system according to claim 10, further comprising:

in response to the composed hardware/software model satisfying the safety property, signaling that the hardware/software co-design fulfills the safety property.

12. The computer system according to claim 10, wherein the abstraction of the first model and the abstracted second model are refined, as long as an error trace resulting from checking if the composed hardware/software model satisfies the safety property in a model checker is not a real error trace in a non-abstracted first model and a non-abstracted second model, respectively.

13. The computer system according to claim 10, wherein refining the first model and the second model is performed by means of interpolation, particularly Craig interpolation.

14. The computer system according to claim 10, wherein verifying whether the counterexample projected on the first model and the second model is a real error trace in the first model and the second model comprises using Bounded Model Checking to leverage the success of fast propositional SAT solvers.

15. The computer system according to claim 10, wherein the hardware model is described by a hardware-centric language, particularly by a hardware description language, and the software model is described by a software-centric language, particularly by a programming language.

16. The computer system according to claim 10, wherein composing the abstracted first model and the second model comprises composing of the abstracted first model and an abstracted second model.

17. The computer system according to claim 10, wherein translating the abstracted first model further comprises:
performing a model check using the model environment described in the property specification language for the verification of the abstracted second model or non-abstracted second model, respectively.

18. The computer system according to claim 10, wherein the model checker comprises conventional model checkers including RuleBase© to compose the model environment described by the Property Specification Language and check the safety property.

* * * * *